United States Patent [19]
Landolt

[11] 3,884,022
[45] May 20, 1975

[54] MEANS FOR WINDROW MAINTENANCE
[76] Inventor: Joseph G. Landolt, Rt. 2, Box 1075, Yerington, Nev. 89447
[22] Filed: Feb. 26, 1973
[21] Appl. No.: 335,837

[52] U.S. Cl. .................................. 56/364; 56/370
[51] Int. Cl. ........................................... A01d 84/00
[58] Field of Search ............ 56/1, DIG. 2, 364, 370, 56/372, 341, 364, 13.3

[56] References Cited
UNITED STATES PATENTS

| | | | |
|---|---|---|---|
| 2,507,635 | 5/1950 | James | 56/13.5 |
| 2,571,489 | 10/1951 | Russell | 56/341 X |
| 2,636,335 | 4/1953 | Whitney | 56/370 |
| 2,727,347 | 12/1955 | Fenster et al. | 56/1 |
| 2,727,350 | 12/1955 | Kublman | 56/370 X |
| 2,955,403 | 10/1960 | McKee | 56/13.3 |
| 3,721,080 | 3/1973 | Marsh | 56/364 |

Primary Examiner—Russell R. Kinsey
Attorney, Agent, or Firm—Phillips, Moore, Weissenberger, Lempio & Strabala

[57] ABSTRACT

A method of harvesting forage crops such as hay including novel windrow maintenance steps which improve the curing thereof in the field and enable an earlier harvest of a second crop thereof is disclosed. A machine specifically adapted to perform the windrow maintenance steps of such process is described. The machine includes a main platform having a back wall and an end wall, means for picking up a windrow of the crop and placing it on the main platform, means for moving the crop along the platform away from the end wall and means for replacing the windrow on the ground.

4 Claims, 5 Drawing Figures

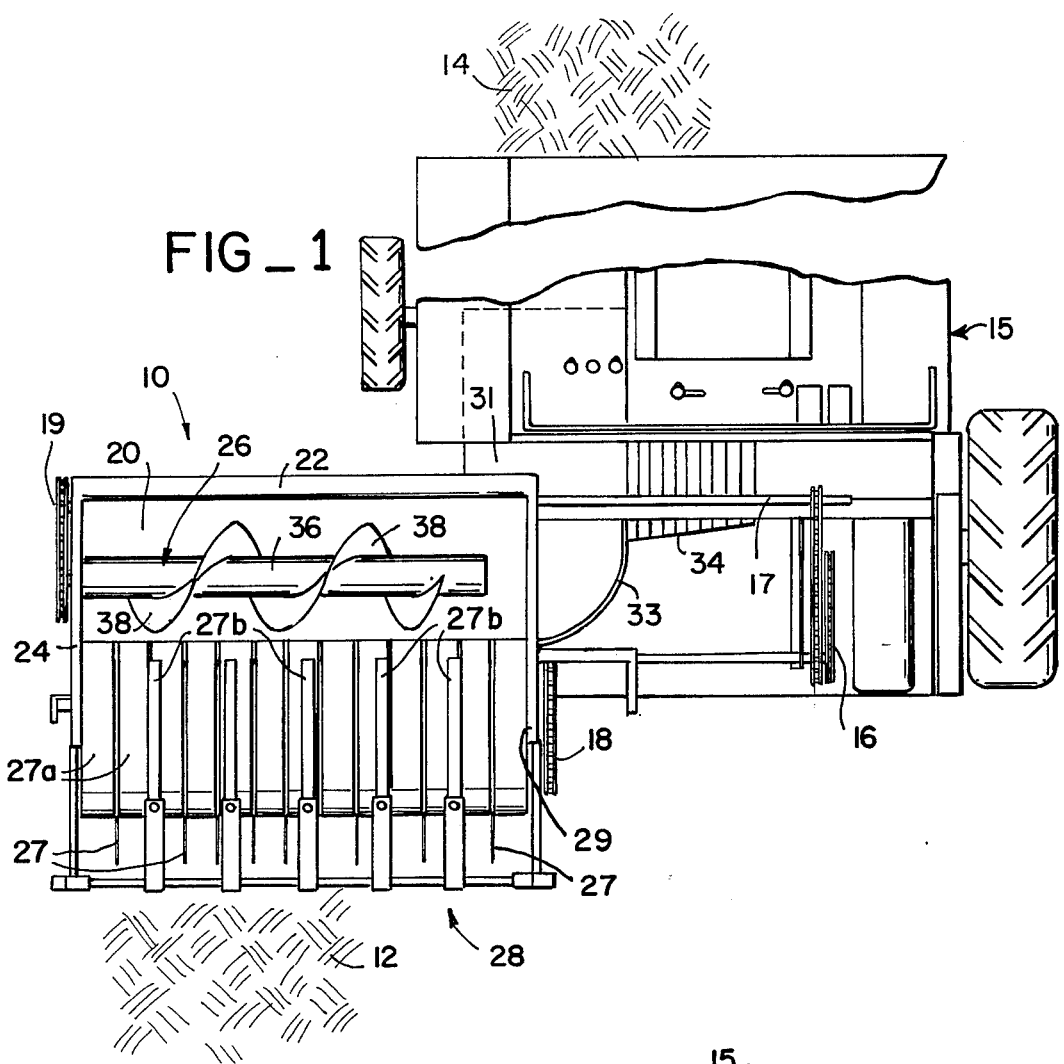
FIG_1
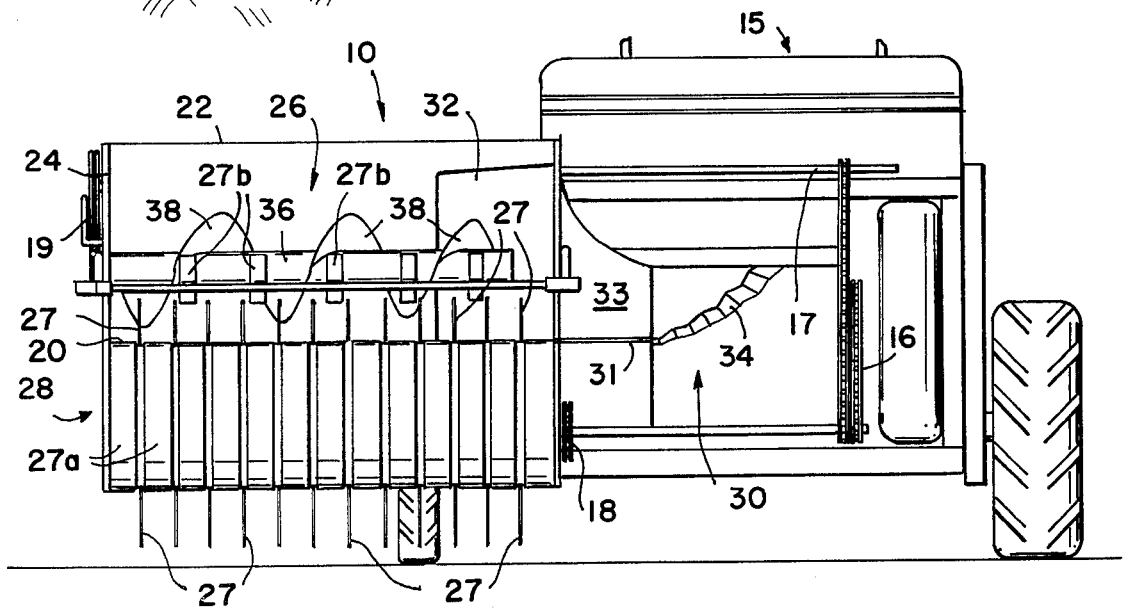
FIG_2

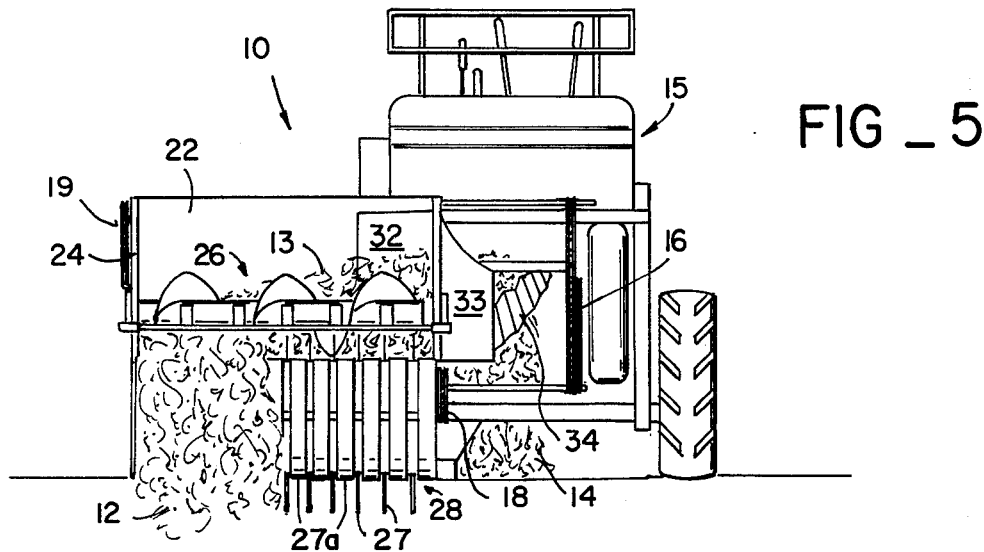
FIG_5
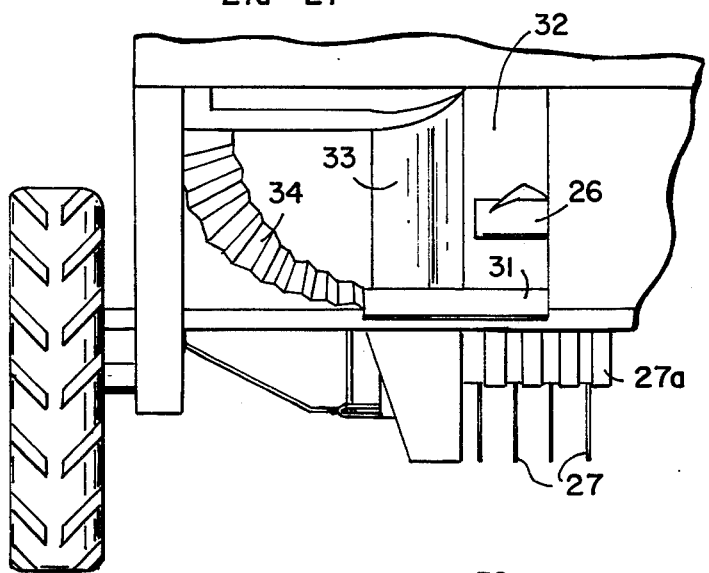
FIG_4
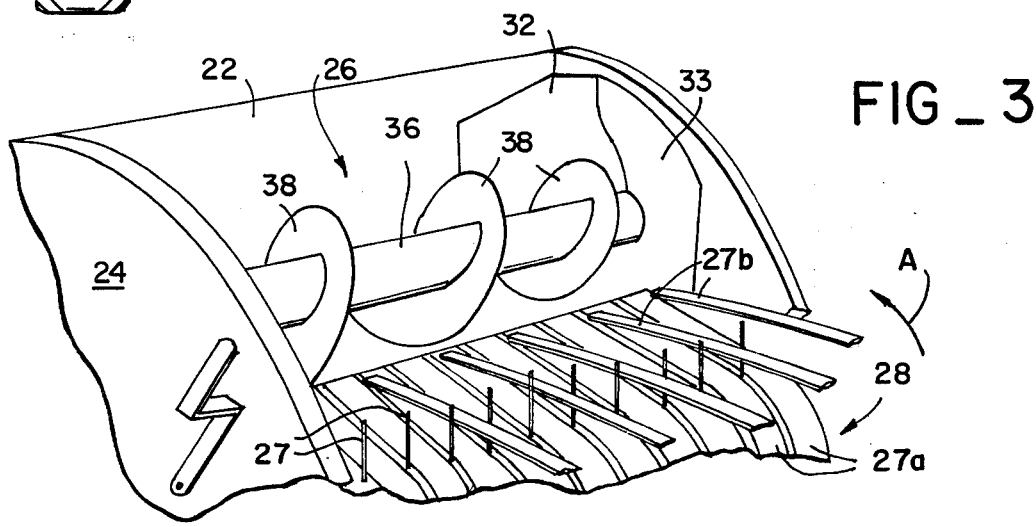
FIG_3

MEANS FOR WINDROW MAINTENANCE

BACKGROUND OF THE INVENTION

1. Field of the Invention

This invention relates to forage crops such as hay or alfalfa and more particularly to certain novel steps in the harvesting of such crops to provide more efficient curing of the crop and to enable earlier harvesting of a subsequent crop as well as to a novel machine for the performance of such steps.

2. Description of the Prior Art

Over the years many methods and machines have been developed in an attempt to promote more efficient curing of forage crops principally based upon the drying of the crop in the field. The most widely accepted practice includes windrowing of the crop in order to facilitate subsequent gathering. The most common windrowing machine is the side delivery rake although other machines utilizing auger or draper delivery are often used.

The length of time between the cutting of the forage crop and the piling of the cut crop into windrows is usually a matter of personal preference and expedience. According to one school of thought, it is best to allow the crop to remain as cut for as long as possible while another school of thought recommends the windrowing of the crop at the earliest possible date.

In any event, the ground under the crop will remain damp for many days after the crop is cut, thus increasing the time required to dry or cure the crop. Where the crop is gathered into windrows soon after cutting, the ground under the windrow and consequently the hay next to the ground may require 5 to 10 days to dry although the ground next to the windrow will dry in less than a day after the crop is cut and gathered into the windrow.

Furthermore a second crop will not begin to grow so long as it is covered by the cuttings of the first crop. Where the crop is gathered into windrow, the second crop may begin to grow between the windrows but it will not begin to grow under the windrow. Thus, the methods and machines of the prior art have either resulted in an increase in the drying time of the cut crop or have impeded the early start of growth of the subsequent crop or both.

SUMMARY OF THE INVENTION

According to the teaching of this invention the forage crop is cut and immediately gathered into windrows. After the ground between the windrows has dried, the windrows are picked up and moved to the dry ground immediately adjacent the former location of the windrow. It is desirable that the hay or other crop in the windrow be replaced in a new windrow in substantially the same position as before so that the underside of the windrow is placed in contiguous contact with the dry ground in its new location. After the crop is fully dried, the windrows are picked up by any conventional method for utilization. The machine for accomplishing the above steps comprises an elongated mobile platform having an upstanding back wall along one side thereof and an upstanding end wall at one end thereof. A pick up means is disposed along the side thereof opposite the back wall. An elongated auger means is mounted on the end wall and extends the length of the platform. Discharge means is located at the end of the auger opposite the end wall and adapted to discharge the crop in a direction perpendicular to the axis of the auger. The mobile platform is adapted to be coupled to a tractor or other appropriate source of motive power not only for moving the platform but also for supplying power to the pick up means and to the auger. According to the teaching of this invention, a windrow of a forage crop is picked up adjacent the closed end of the platform, moved by the auger along the platform to the discharge end thereof and replaced on the ground by the discharge means.

BRIEF DESCRIPTION OF THE DRAWING

FIG. 1 is a top plan view of one embodiment of the machine for practicing the method of this invention;

Fig. 2 is a front view in elevation of the machine shown in FIG. 1;

FIG. 3 is a perspective view of the machine of FIGS. 1 and 2 showing the relationship between the pick up means, the auger means and the discharge means;

FIG. 4 is an enlarged rear view of the machine of FIGS. 1 and 2 showing the details of the discharge means;

FIG. 5 is a reduced front view similar to FIG. 2 but showing the machine in operation moving a windrow of a crop from one location to another in accordance with the teaching of this invention.

DESCRIPTION OF A PREFERRED EMBODIMENT

Referring to FIG. 1 a top view of a machine 10 in accordance with the teaching of this invention is shown in the process of moving a windrow from one position 12 to an adjacent parallel position 14. That portion of the crop in the process of being moved on the machine is not shown in FIG. 1 in order to expose all parts of the machine. However, in the front view of the machine shown in FIG. 5 that portion 13 of the crop which is on the machine itself in the process of being moved is shown.

As most clearly shown in FIG. 1, a machine for use in accordance with the teaching of this invention comprises an elongated platform 20. In the embodiment shown, the elongated platform is mounted on a tractor or other vehicle 15. However, it will be understood that such platform could be mounted on wheels for appropriate coupling to a tractor or other vehicle in order to enable it to be moved at will in the field. An upstanding back wall 22 is provided along one side of the elongated platform 20 and an upstanding end wall 24 is provided at one end of the elongated platform 20. An auger means 26 is mounted on the end wall 24 with its axis extending along the length of the elongated platform 20. A pick up means indicated generally at 28 is disposed along the other side of the elongated platform 20 from the back wall 22. The end of the elongated platform 20 opposite the end wall 24 is provided with a discharge means 30 whereby the crop is discharged from the platform 20 in a direction perpendicular to the length of the elongated platform 20.

It will be understood that the specific pick up means shown in the Figures of the drawing is not a part of this invention. Instead such pick up means may comprise any of the known pick means currently in use in the art. However, pick up means of the type 28 shown in the drawing is believed to be the most widely used and efficient type currently available. Similarly, the drive system for supplying power from the tractor 15 or other vehicle to the auger 26 and pick up means 28 may be of any type currently used in farm machinery. In the embodiment shown in the drawing, the chain and sprocket system 16 is adapted to apply power from the tractor 15 to the shafts 17. The power from the shafts 17 is, in turn, applied to the pick up means 28 and to the auger 26 by means of chain and sprocket assemblies 18 and 19, respectively.

According to this embodiment, the pick up means is of conventional design (see U.S. Pat. No. 2,770,937, for example) and comprises a drum (not shown) journalled in an extension of end wall 24 and through a support 29. Sprocket assembly 18 is coupled to the drum to enable power driven rotation thereof. The drum is provided with a plurality of axially spaced radially extending sets of tines or spiders 27 and a plurality of stripper bars 27a are mounted on the platform and curve downwardly therefrom between the sets of tines 27. The drum is rotated in the direction indicated by the arrow A in FIG. 3 and the tines 27 emerging from between the stripper bars 27a sweep the crop upwardly and onto the platform 20 into engagement with the auger. A set of gripper arms 27b may be mounted above the stripper bars 27a as shown in order to provide more efficient feeding of the crop onto the platform 20 and into engagement with the auger 26.

According to the embodiment of the invention shown in the drawing, the discharge means 30 comprises an elongated sloping platform 31 extending rearwardly from the discharge end of the platform 20 underneath the tractor 15 as shown in FIG. 1. An opening 32 through the upstanding back wall 22 provides a passageway from the discharge end of the platform 20 onto the input end of the platform 31 of the discharge means 30. The discharge means 30 also includes a curved end wall 33 at the end of the platform 20 which cooperates with the opening 32 to direct the crop from the platform 20 onto the platform 31 in a direction normal to the length of the platform 20. The platform 31 is provided with an upwardly curved extension 34 along the edge thereof adjacent the deflector wall 33 in order to assist in deflector 33 in causing the crop to move along the platform 31 in a direction normal to the length of the platform 20.

As best shown in FIG. 4 the platform 31 and extension 34 may extend downwardly toward the ground from the height of the platform 20 in order to obtain the assistance of gravity in moving the crop along the platform 31 and extension 34. At the end of the platform 31 and extension 34 the crop is dropped onto the ground in a windrow 14 parallel to, but spaced from, the windrow 12 being picked up by the pick up means 28.

As best shown in FIG. 3, the auger means 26 comprises a core 36 mounted on a shaft (not shown) which is journalled into the end wall 24. The core 36 is provided with a flight of sinuous convolutions 38 extending the length thereof. The auger means 26 is mounted so that the edge portions of the convolutions 38 thereof are generally spaced from the platform 20 by about one inch and from the back wall by about 18 inches. However, in the last one foot of the auger means 26 adjacent the discharge opening 32, the radial length of the convolutions 38 is gradually reduced by about one inch, so that at the end of the auger means 26, the ends of the convolutions 38 are spaced from the platform 20 by two inches and from the back wall by about 19 inches. Thus, the crop picked up by the pick up means 28 and deposited on the platform 20 will be urged by the rotation of the auger means to proceed toward the discharge opening 32. The crop will move along between the auger and both the platform 20 and back wall 22 until it is deflected by the deflector wall 33 onto the platform 31 and extension thereof 34. The crop will move along the platform 31 and extension thereof 34 in a direction normal to the axis of the auger means under the influence of both gravity and pressure from the incoming crop.

As best shown in FIG. 5 a windrow 12 of the crop is preferably picked up as close to the closed end of the platform 20 as possible. The crop is then moved by the auger means 26 along the platform 20 the discharge opening 32. From the discharge opening 32 the crop moves along the platform 31 and extension 34 thereof in a direction normal to the axis of the auger means 26 until it drops off onto the ground in a new windrow 14 spaced from but parallel to the original windrow 12.

It is preferred that the discharge end of the platform 31 be at some height from the ground in order to enhance the fluffing or loosening of the crop in the windrow which is inherent in the movement of the crop from one windrow to another as described above. Such fluffing or loosening of the crop hastens the drying or curing process thereof. However, it will be seen that the crop is otherwise deposited in the new windrow 14 in substantially the same organization with respect to itself as it had in the old windrow 12. Thus, the underside of the old windrow 12 tends to be placed in contact with the dry ground in new windrow 14. Such contact hastens the drying of the normally damp underside of the windrow while at the same time avoiding the mixing of damp crop from the underside of the windrow with the more nearly dry or cured crop at the upper side of the windrow.

In practicing the method of this invention applicant prefers to cut the crop with a machine commonly known as a hay swather. In such a machine the crop is cut with a sickle and then fed onto a platform where auger means moves it from each side to the middle where the stems of the crop are crimped or bent in order to avoid compacting of the crop and the crop is then dropped onto a windrow 3 to 4 feet wide on the ground. This enables a second crop to begin growing between the windrows immediately.

After a day or so, the machine described hereinabove is used to pick up the windrow and move it over onto the dry ground adjacent the original windrow. This permits the growth of the second crop to begin in the location of the original windrow which growth would have been impeded by the presence of the original windrow. In its new position the windrow will be deposited after growth of the crop has already begun and will not be as damp nor as compacted as it was in the original windrow. Thus in its new position the windrow will not offer as great an impediment to the growth of the second crop as it would have if it had been left in its original position.

Furthermore, the windrow can be moved a second time, if necessary, after a day or so and as it becomes more nearly cured it will offer a decreasing impediment to the growth of the second crop in its new positions. After the crop is fully cured, the windrows may be picked up by any conventional means for baling or other utilization.

Applicant has found that the curing for crops such as hay or alfalfa may be reduced by an amount approaching 50 percent of the normal curing time through the use of his method and machine described hereinabove. Applicant has also found that the growth of the second crop is substantially accelerated through the use of his method and machine. Furthermore, the growth of the second crop is much more uniform in the field tending to provide increased production in the second crop.

It will be understood that the embodiment of applicant's machine shown in the drawings and described hereinabove is merely one of the preferred embodiments of such machine. It is anticipated that those skilled in the art may introduce various modifications in such machine without departing from the teaching of applicant's invention. As pointed out above, other pick up means could be used although the pick up means disclosed in the drawing is believed to be particularly desirable in terms of its inherent tendency to fluff or loosen the crop in the windrow. Similarly, modifications might be made in the auger means and in the discharge means to further enhance the highly desirable effects of applicant's method and machine.

What is claimed is:

1. A machine for use in harvesting forage crops comprising:
   a. an elongated mobile main platform;
   b. an upstanding back wall along one side of said platform;
   c. an upstanding wall member along one end of said platform;
   d. a pick up means along the side of said platform opposite said back wall and adapted to pick up a windrow of said crop and deposit it on said platform;
   e. means for moving said crop along the length of said platform from said one end to the other end thereof; and
   f. discharge means at said other end of said platform for discharging said crop in a direction normal to the length of said platform, said discharge means comprising a second elongated platform extending rearwardly from said main platform at said other end thereof and a curved deflector wall extending along said other end of said main platform for directing said crop onto said second elongated platform.

2. A machine as claimed in claim 1 wherein said means for moving said crop along said platform is an auger.

3. A machine as claimed in claim 1 wherein said main platform is elevated above the ground and the length of said second platform is inclined toward the ground.

4. A machine as claimed in claim 2 wherein said pick up means comprises a drum having its axis extending in a direction substantially parallel to said length of said main platform, a plurality of sets of radially extending tines axially spaced along said drum, and a plurality of downwardly curved stripper bars mounted on said platform each between a different pair of said sets of tines; and wherein said main platform is mounted on a vehicle for movement in the field, which vehicle also provides power for rotating said auger and said drum of said pick up means.

* * * * *